United States Patent
Buss et al.

(10) Patent No.: US 12,139,106 B2
(45) Date of Patent: Nov. 12, 2024

(54) DEVICE FOR SUPPLYING AIR TO A SUCTION SIDE OF A PUMP, COMPONENT UNIT HAVING SUCH A DEVICE AND WIPER SYSTEM

(71) Applicant: Valeo Systèmes d'Essuyage, Le Mesnil Saint Denis (FR)

(72) Inventors: Michael Buss, Bietigheim-Bissingen (DE); Felix Faehnle, Bietigheim-Bissingen (DE); Wolfgang Scholl, Bietigheim-Bissingen (DE)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 484 days.

(21) Appl. No.: 17/602,111

(22) PCT Filed: Mar. 16, 2020

(86) PCT No.: PCT/EP2020/057062
§ 371 (c)(1),
(2) Date: Oct. 7, 2021

(87) PCT Pub. No.: WO2020/207705
PCT Pub. Date: Oct. 15, 2020

(65) Prior Publication Data
US 2022/0194326 A1    Jun. 23, 2022

(30) Foreign Application Priority Data
Apr. 10, 2019   (DE) ..................... 10 2019 109 457.7

(51) Int. Cl.
*B60S 1/52*    (2006.01)
*B60S 1/50*    (2006.01)
*B60S 1/54*    (2006.01)

(52) U.S. Cl.
CPC ................. *B60S 1/50* (2013.01); *B60S 1/524* (2013.01); *B60S 1/544* (2013.01)

(58) Field of Classification Search
CPC ..... B08B 3/00; B08B 3/02; B08B 3/04; B60S 1/46; B60S 1/48; B60S 1/481;
(Continued)

(56) References Cited

U.S. PATENT DOCUMENTS 5,533,779 A * 7/1996 Epple ................... B62D 25/081
                                                        296/192
6,161,566 A * 12/2000 Klamm ................ F01P 11/0276
                                                         123/41.14
(Continued)

FOREIGN PATENT DOCUMENTS

DE      3713932 A1    11/1988
DE  102010025688 A1    1/2012
(Continued)

OTHER PUBLICATIONS

Machine Translation of Goto et al., JP 2019-018807 A, Feb. 2019. (Year: 2019).*
(Continued)

*Primary Examiner* — David G Cormier
(74) *Attorney, Agent, or Firm* — Osha Bergman Watanabe & Burton LLP

(57) ABSTRACT

A device (50) for supplying air to a suction side (12) of a pump (10) of a wiper system (100), includes a suction channel (60) for sucking in air, said suction channel (60) being able to be connected to the suction side (12) of the pump (10). Provision is made that the device (50) is realized as a component separate from the pump (10) and comprises a connection area (52) for connecting the device (50) with a supply container (14) for washer fluid (3) and having an additional connection area (54) for a suction nozzle (24) of
(Continued)

Figure 1:
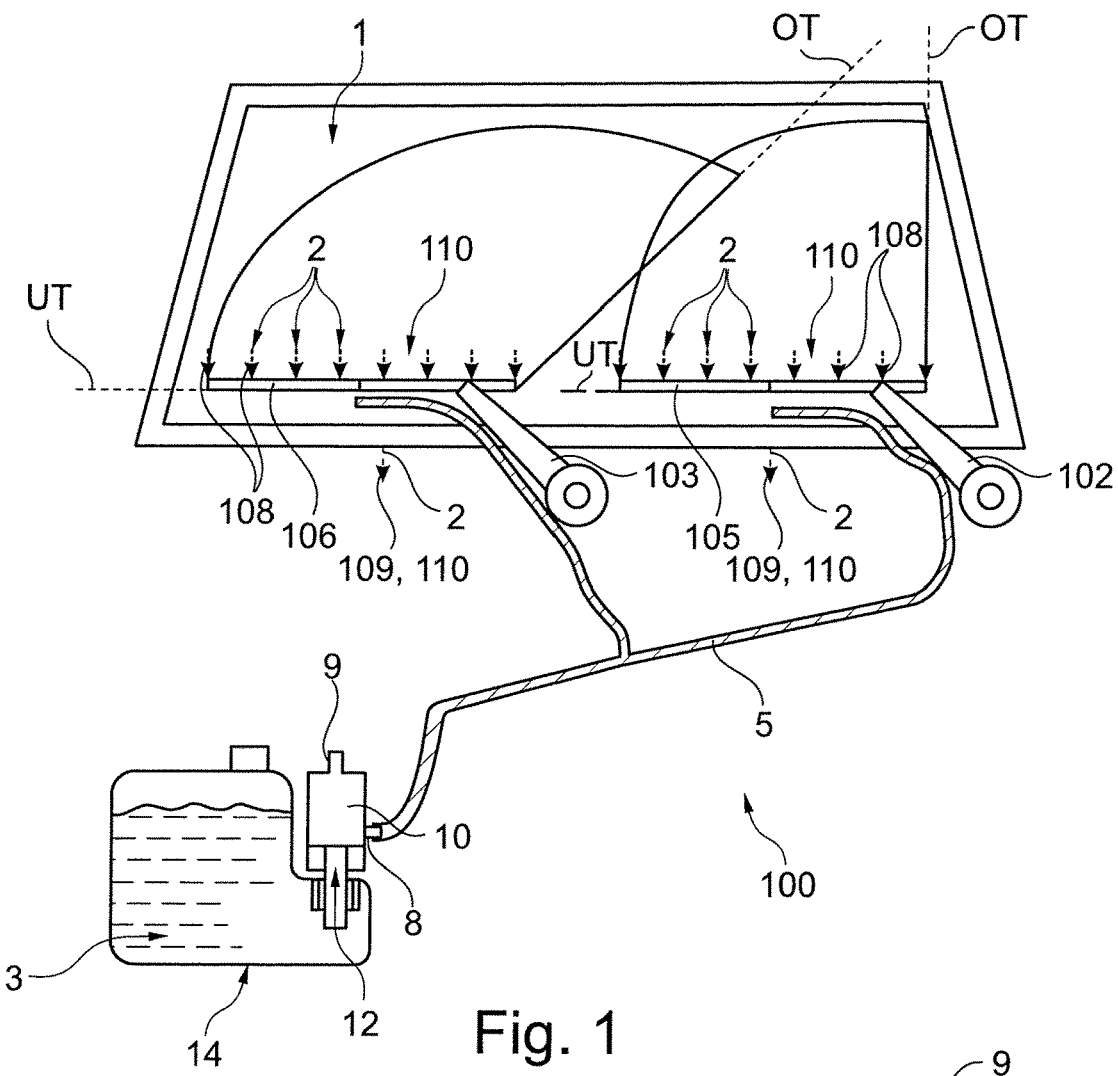

the pump (10), and that a check valve (62) is disposed in the suction channel (60), said check valve (62) being designed to open and close as a function of a negative pressure (P) on a suction nozzle (24) of the pump (10), whereby when the said check valve (62) is opened air can enter the area of the suction nozzle (24) of the pump (10), and when the check valve (62) is closed no air is sucked in.

15 Claims, 2 Drawing Sheets

(58) Field of Classification Search
CPC .. B60S 1/482; B60S 1/483; B60S 1/50; B60S 1/52; B60S 1/524; B60S 1/54
See application file for complete search history.

(56) References Cited

U.S. PATENT DOCUMENTS

| | | |
|---|---|---|
| 2008/0112817 A1 | 5/2008 | Sylvester |
| 2010/0052193 A1 | 3/2010 | Sylvester |
| 2013/0125991 A1 | 5/2013 | Lau |
| 2013/0200109 A1* | 8/2013 | Yang ................. A47K 5/16 222/190 |
| 2014/0319180 A1 | 10/2014 | Quinlan et al. |
| 2016/0068139 A1 | 3/2016 | Gunnels |
| 2018/0044902 A1* | 2/2018 | Geymer ................. E03D 9/02 |
| 2019/0022604 A1 | 1/2019 | Sasaki et al. |

FOREIGN PATENT DOCUMENTS

| | | |
|---|---|---|
| DE | 102014118184 A1 | 6/2016 |
| DE | 102018113951 A1 | 12/2019 |
| EP | 2223642 A2 | 9/2010 |
| JP | S5663538 A | 5/1981 |
| JP | 2016016815 A | 2/2016 |
| JP | 2019018807 A | 2/2019 |
| KR | 20020044768 A | 6/2002 |
| KR | 20150130190 A | 11/2015 |
| KR | 101585653 B1 | 1/2016 |

OTHER PUBLICATIONS

International Search Report and Written Opinion in corresponding International Application No. PCT/EP2020/057062, mailed May 29, 2020 (8 pages).
Yukai Sun et al. "Automotive Electronic Control Scrubber", China Academic Journal Electronic Publishing House, pp. 38-39, Sep. 9, 2009. (9 Pages including English Translation).
First Office Action Issued in corresponding CN Application No. 202080027689.0, dated Mar. 30, 2023. (9 Pages).

* cited by examiner

DEVICE FOR SUPPLYING AIR TO A SUCTION SIDE OF A PUMP, COMPONENT UNIT HAVING SUCH A DEVICE AND WIPER SYSTEM

PRIOR ART

The invention relates to a device for supplying air to a suction side of a pump of a wiper system having the features of the pre-characterizing clause of claim 1. Furthermore, the invention relates to a component unit having a device according to the invention and to a wiper system.

A device for supplying air to the suction side of a pump having the features of the pre-characterizing clause of claim 1 is known from the subsequently published DE 10 2018 113 951 A1 from the applicant. The known device is used to supply air to a pump at its suction side, in order that the pump mixes liquid cleaning medium sucked in by means of the air and can convey the same into the region of a vehicle window as a cleaning foam. The use of such a cleaning foam instead of a liquid cleaning medium has the advantage that the consumption of cleaning medium is reduced with a comparable cleaning performance, which, for example, leads to a reduction in the overall size and the weight of a storage container for the (liquid) cleaning medium. To this end, in the known device, provision is made for this to be an integral component part of the suction side or the suction nozzle of the pump. In other words, this means that the suction nozzle of the pump, which is connected to the pump, is simultaneously designed to supply air.

Advantages of the Invention

The device according to the invention for supplying air to a suction side of a pump of a wiper system, having the features of claim 1, has the advantage that it is formed as a component which is independent of the pump or of the suction nozzle of the pump, and thus is adaptable for pumps which usually provide no supply of air to the suction side or have a conventional suction nozzle. As a result, a type of modular system is made possible, in which one and the same pump having one and the same suction nozzle is used in a first case in a conventional manner merely to supply liquid cleaning medium and, in another case, can be configured by means of the device according to the invention to supply a cleaning foam.

Against this background, the teaching of the invention according to claim 1 therefore proposes that the device for supplying air is designed as a component which is separate from the pump and comprises a connection area for connecting the device to a supply container for washer fluid and an additional connection area for a suction nozzle of the pump, and that a check valve is arranged in the suction channel for the air, the said check valve being designed to open and close as a function of a negative pressure on a suction nozzle of the pump, wherein when the said check valve is open, air can enter the area of the suction nozzle of the pump, and when the check valve is closed, no air is sucked in.

The check valve can be designed as a spring-loaded check valve or as a check valve in the form of a so-called duckbill valve loaded in the closing direction by the ambient pressure. In the first-named valve, the closing forces acting on the check valve are composed of the closing force of the spring and of the pressure difference between the side of the check valve that is connected to the suction side of the pump and the ambient pressure.

Such a configuration according to the teaching of the invention thus not only permits designing the device according to the invention as a separate component that can be adapted to a pump but, by means of the changing pressure on the check valve, also controls the entry of air to the suction side of the pump, wherein a reverse flow of air or cleaning liquid out of the check valve to the surroundings is avoided.

Advantageous developments of the device according to the invention for supplying air to a suction side of a pump of a wiper system are listed in the sub-claims.

In one preferred design configuration of the device, provision is made for the suction channel to comprise a first section, in which the check valve is arranged, and for the first section to be connected to a second section, which forms a part of the additional connection area for the suction nozzle of the pump.

In a development of the last proposal, provision is made for the second section of the suction channel to be designed to surround the suction nozzle of the pump radially, forming a supply gap, wherein the supply gap is connected to the suction side of the pump. Such a configuration has in particular the advantage that no bore or the like must be provided in the device in order that the air from the check valve passes in the direction of the suction side of the pump. Instead, the supply gap can in particular be formed by a longitudinal groove in the additional connection area of the device for supplying air and the outer circumference of the suction nozzle of the pump.

A further preferred refinement relates to the fluidic guidance of the liquid sucked in, in such a way that the latter is accelerated in the direction of the suction nozzle as it is sucked in. As a result of the acceleration, a pressure that is reduced as compared with the ambient or atmospheric pressure is achieved, which acts as far as the check valve and permits air to be sucked in there. To this end, the device provides for an element comprising a cross-sectional constriction acting as a throttle for the washer fluid to be arranged in the additional connection area. Furthermore, it is mentioned that, by means of the cross-section or the hole diameter in the throttle, it is also possible to influence the volume of the quantity of air sucked in by the check valve, and therefore also the foam composition.

In order to be able to adapt the throttle action to the respective case of use or the respective pump very simply without a separate (injection moulding) tool being required for the device as a result, provision can be made for the element (having the cross sectional constriction) to be sleeve-shaped and to be arranged in the additional connection area in a sealing manner.

In a preferred refinement of the check valve, the latter is designed as a duckbill valve.

In a preferred refinement of the device for supplying air, the latter has a basic body which is made of a rubber material or a thermoplastic elastomer, so that it is possible to dispense with a separate element acting as a seal relative to the tank.

In order to avoid foreign bodies or the like being sucked in via the device and reaching the suction side of the pump and, as a result, impairing the function of the pump, for example, provision can additionally be made for a filter element to be arranged on the side of the check valve facing away from the suction channel.

The invention also comprises a component unit, comprising a pump for sucking in washer fluid from a supply container, wherein the pump has a suction nozzle, and also a device according to the invention described to this extent, wherein the suction nozzle of the pump protrudes into the additional connection area of the device. In other words, this means that the component unit is formed by two components, firstly the pump and secondly the device according to the invention, wherein the two separate components are connected to each other via the suction nozzle of the pump.

Alternatively, the invention also comprises a component unit which comprises a supply container for washer fluid and a device according to the invention described to this extent, wherein an opening of the supply container surrounds the connection area of the device in a sealing manner. Such a component unit, which likewise consists of two separate components which are connected to each other, can subsequently be assembled over the suction nozzle of the pump to form an overall unit.

Furthermore, the invention also comprises a wiper system for cleaning a vehicle window, having a supply container for a washer fluid, having a pump for sucking the washer fluid in from the supply container and having at least one duct for supplying cleaning medium from a pressure side of the pump to a spraying device, wherein the spraying device is designed to spray the cleaning medium onto the vehicle window in the wiping area of at least one wiper blade, and wherein a suction side of the pump is at least indirectly connected to a device for supplying air, so that the suction side of the pump sucks in air from the pump in addition to the washer fluid, in order to produce a foam-like cleaning medium from the washer fluid and the air at the pressure side. The wiper system according to the invention is distinguished by the fact that the device for supplying the air has a check valve, which is designed to open and close as a function of a negative pressure on the suction side of the pump, wherein when the check valve is open, air can enter the region of the suction nozzle of the pump, and when the check valve is closed, no air is sucked in.

In a development of the wiper system described to this extent, provision is made for the pump to be designed to foam the washer fluid together with the air sucked in, preferably via at least one vane element or the like of the pump. To this end, provision is made in particular for the pump to be designed as a vane cell pump.

There are also different configurations with regard to the spraying device of the wiper system. In a first configuration, it is possible for the spraying device to have at least one spray nozzle ("Aqua Blade") integrated in the at least one wiper blade. As an alternative to this end, provision can also be made for the spraying device to have at least one spray nozzle which is separate from the at least one wiper blade.

Figure 2:
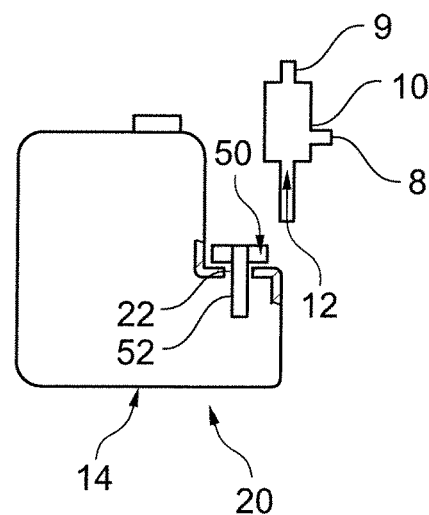
Figure 3:
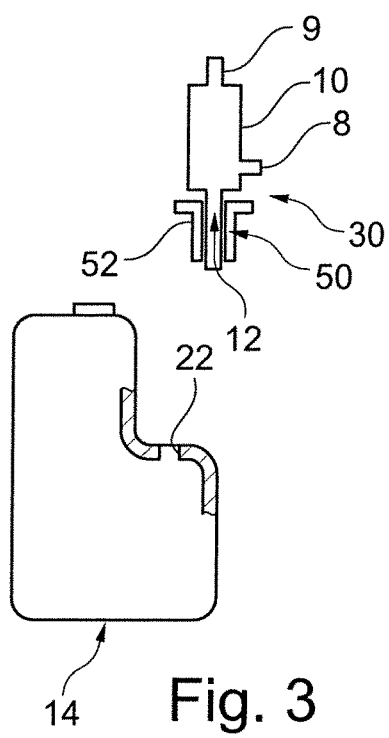
Figure 4:
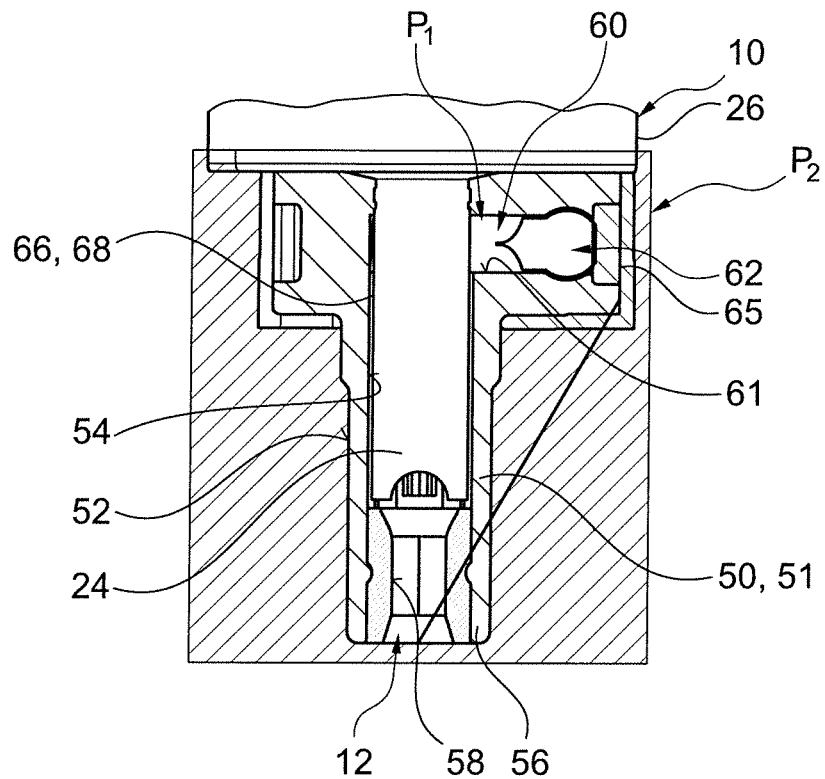
Figure 5:
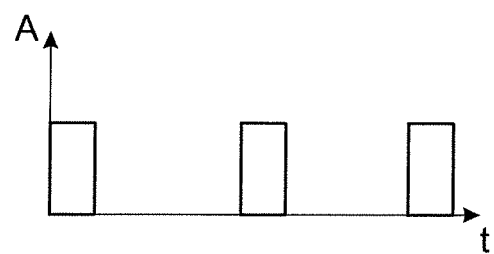

Further advantages, features and details of the invention can be gathered from the following description of preferred exemplary embodiments and by using the drawings, in which:

FIG. 1 shows a simplified illustration of a wiper system for cleaning a vehicle front window, FIG. 2 shows a schematic illustration of a component unit, comprising a supply container for cleaning medium and a device for supplying air, FIG. 3 shows a component unit modified with respect to FIG. 2, comprising a pump and a device for supplying air connected to the suction nozzle of the pump, FIG. 4 shows a sub-area of the component unit according to FIG. 3 in a longitudinal section, and FIG. 5 shows a flowchart to illustrate the action of sucking in air by means of a device according to the invention for supplying air.

DESCRIPTION OF THE EXEMPLARY EMBODIMENTS

The same elements or elements having the same function are provided with the same reference numbers in the figures.

In FIG. 1, the important component parts of a wiper system 100 for cleaning a vehicle window 1, a vehicle front window in the exemplary embodiment, are illustrated. The wiper system 100 comprises, by way of example, two wiper arms 102, 103 with wiper blades 105, 106 fixed replaceably thereto, which can be pivoted to and fro between the lower reversal position UT and an upper reversal position OT by means of a drive (windscreen wiper motor), not shown, in order to clean the vehicle window 1.

To apply a cleaning medium 2 in the form of a cleaning foam to the vehicle window 1, each of the two wiper blades 105, 106 has, by way of example, multiple spray nozzles 108 thereon spaced apart from one another in the longitudinal direction. As an alternative thereto, provision can also be made for each of the two wiper blades 105, 106 to be assigned a spray nozzle 109 arranged in a fixed location. The spray nozzles 108 and 109 thus each form a spraying device 110.

The cleaning medium 2 is supplied to the spray nozzles 108 and 109 by means of at least one hydraulic duct in the form of a hose 5, which is connected to a pressure side 8 of a pump 10. Via its suction side 12, the pump 10 sucks in liquid washer fluid 3 stored in a supply container 14, it being possible for additives, in particular foaming agents, to be added to the washer fluid 3. The pump 10 is formed as a vane cell pump and, for this purpose, has at least one vane (not illustrated) rotatably arranged in the pump 10. The pressure side 8 of the pump 10, designed in the form of a pressure nozzle, is located on the side of the pump 10, preferably just above the suction side 12. In addition, the pump 10 has a connecting plug 9, merely illustrated symbolically.

Various arrangements of the pump 10 with the supply container 14 will be explained below by using FIGS. 2 and 3. FIG. 2 illustrates a component unit 20, which comprises the supply container 14 and a device 50 for supplying air from the suction side 12 of the pump 10. To this end, the supply container 14 has in one wall an opening 22, into which the device 50 protrudes, the device 50 being sealed off relative to the opening 22. The component unit 20 can be completed by connecting the pump 10 to the device 50 to form a functioning installation unit for a vehicle. It is important that the device 50 is formed as a component which is separate from the pump 10.

FIG. 3 shows a component unit 30 that is modified with respect to FIG. 2 comprising the device 50 for supplying air to the suction side 12 of the pump 10 in addition to the pump 10. On its outer circumference, the device 50 has a connection area 52, which is designed to be inserted into the opening 22 of the supply container 14, forming a sealing connection, in order as a result to complete a functioning installation unit for a vehicle. Here, too, the device 50 is formed as a component which is separate from the pump 10.

FIG. 4 shows the area of the device 50 and the end of the pump 10 that faces the device 50 in the component unit 30 in an enlarged illustration. In particular, it can be seen that the device 50 has a basic body 51 consisting of rubber material or of a thermoplastic elastomer such as Santopren with an additional connection area 54 designed in the form of a passage opening, into which the suction side 12 of the pump 10 protrudes with a suction nozzle 24. In the longitudinal direction of the suction nozzle 24, in the additional connection area 54, there follows a sleeve-shaped element 56, which is formed as an injection moulded part made of plastic and which rests in a sealing manner with its outer circumference on the wall of the additional connection area 54 of the device 50. The sleeve-shaped element 56 has a passage opening in the form of a cross-sectional constriction 58, via which the washer fluid 3 reaches the suction side 12 of the pump 10. From a fluidic point of view, the cross-sectional constriction 58 thus forms a throttle for the washer fluid 3.

The device 50 has a suction channel 60 for supplying air to the suction side 12 of the pump 10. The suction channel 60 has a first section 61, which runs at right angles to the suction nozzle 24 of the pump 10 and is arranged close to the pump housing 26 of the pump 10. Arranged within the first section 61 is a substantially at least partially conical check valve 62, which is designed in the form of a so-called duckbill valve, which permits air from the surroundings to be sucked into the suction channel 60. In order to avoid sucking foreign bodies or dirt into the suction channel 60 via the check valve 62, the suction area of the check valve 62 is additionally covered by a filter element 65 on the side of the check valve 62 that faces away from the suction side 12.

The first section 61 is connected to a second section 66 of the suction channel 60, which in turn is connected to the suction side 12 of the pump 10. The second section is, by way of example, designed in the form of a longitudinal groove 68 in the additional connection area 54 of the device 50, which area is arranged on the side of the suction nozzle 24 that is opposite the check valve 62. The second section 66 intersects the first section of the suction channel 60 in the longitudinal direction of the additional connection area 54 and, as a result, is connected to the first section 61. The second section 62 ends just underneath the suction nozzle 24 but in front of the sleeve-shaped element 56, so that air sucked in via the suction channel 60 can enter the suction nozzle 24 directly.

When the check valve 62 is open, (ambient) air passes via the suction channel 60 into the area of the suction side 12 or of the suction nozzle 24 of the pump 10, the pump simultaneously sucking in washer fluid 3 from the supply container 14 via the sleeve-shaped element 56 together with the air. The washer fluid 3, together with the air, passes from the suction side 12 of the pump 10 to the pressure side 8 of the latter, thorough mixing and swirling of the washer fluid 3 with the air being carried out by the aforementioned vane element of the pump 10, as a result of which foaming is carried out in the desired manner. Foam-like cleaning medium 2 under pressure is thus present on the pressure side 8 of the pump 10, in order to be conveyed to the spray nozzles 108, 109.

During the operation of the pump 10, in which in particular its vane element is rotated continuously, the check valve 62 is opened and closed cyclically as a function of the pressure $P_1$ prevailing on the suction side 12 and the suction channel 16, and the ambient pressure $P_2$ prevailing outside the check valve 62 and the device 50, and on the basis of the forces generated by the pressures $P_1$ and $P_2$. If the pump 10 is switched on, then the pressure $P_1$ on the suction side 12 and the suction channel 60 initially falls abruptly as compared with the pressure $P_2$. This effects an opening of the check valve 62, so that ambient air passes via the suction channel 60 to the suction side 12 or the suction nozzle 24. This in turn effects a reduction in the pressure $P_1$ as compared with the switching on, until the pressure difference that is still present between $P_1$ and $P_2$ is overcompensated, so that the check valve 62 closes. This in turn effects an abrupt pressure reduction on the suction side 12, i.e. in turn a reduction in the pressure $P_1$ in such a way that the check valve 62 opens again. This relationship between the cyclic opening and closing of the check valve 62 and thus the cyclic suction of ambient air in the direction of the suction side 12 of the pump is illustrated in FIG. 5. The cyclic opening and closing of the check valve 62 (value A) over the time t is illustrated. In the example illustrated, the cycle ratio relating to the example is 1:4, i.e. the check valve 62 is open during 25% of the operation of the pump 10.

The wiper device 100 and the device 50 described to this extent can be modified in multifarious ways without departing from the ideas of the invention. It is important to the invention that the device 50 is formed as a component which is separate from the pump 10 and the supply container 14, the device 50 being arranged as an intermediate element between the supply container 14 and the pump 10.

LIST OF REFERENCE SYMBOLS

1 Vehicle window
2 Cleaning medium
3 Washer fluid
5 Duct
8 Pressure side
9 Connecting plug
10 Pump
12 Suction side
14 Supply container
16 Vane
20 Component unit
22 Opening
24 Suction nozzle
26 Pump housing
30 Component unit
50 Device for supplying air
51 Basic body
52 Connection area
54 Additional connection area
56 Sleeve-shaped element
58 Cross-sectional constriction
60 Suction channel
61 First section
62 Check valve
65 Filter element
66 Second section
68 Longitudinal groove
100 Wiper system
102 Wiper arm
103 Wiper arm
105 Wiper blade
106 Wiper blade
108 Spray nozzle
109 Spray nozzle
110 Spraying device
UT Lower reversal position
OT Upper reversal position
$P_1$ Pressure
$P_2$ Ambient pressure

The invention claimed is:

1. An assembly for supplying air to a wiper system, the assembly comprising:
   a pump comprising:
      a suction side, and
      a suction nozzle;
   a device comprising:
      a suction channel for suctioning the air, the suction channel being able to be connected to the suction side of the pump,
      wherein the suction channel comprises a first section and a second section;
      wherein the device is realized as a component separate from the pump;

a connection area for connecting the device with a supply container for washer fluid;

an additional connection area for the suction nozzle of the pump, wherein the second section radially surrounds the suction nozzle to form a supply gap fluidly connected to the suction side of the pump; and a check valve disposed in the suction channel, the check valve being realized for opening and closing as a function of a negative pressure on the suction nozzle of the pump, whereby when the check valve is opened, the air enters an area of the suction nozzle of the pump, and when the check valve is closed, no air is sucked.

2. The assembly according to claim 1, wherein the check valve is arranged in the first section, wherein the first section is connected with the second section which forms a part of the additional connection area for the suction nozzle of the pump.

3. The assembly according to claim 2, wherein the second section is connected with the suction side of the pump.

4. The assembly according to claim 1, wherein in the additional connection area an element is arranged, the element comprising a cross-sectional constriction which acts as throttle for the washer fluid.

5. The assembly according to claim 4, wherein the element is sleeve-shaped and is arranged in the additional connection area in a sealing manner.

6. The assembly according to claim 1, wherein the check valve is designed as a duckbill-valve.

7. The assembly according to claim 1, wherein the device has a basic body which is made of plastic and realized as an injection moulded part.

8. The assembly according to claim 1, wherein a filter element is disposed on a side of the check valve facing away from the suction channel.

9. A component unit, comprising:
the pump for suctioning the washer fluid from the supply container, the pump comprising the suction nozzle; and
the device, which serves for supplying the air and the assembly is realized according to claim 1, the suction nozzle of the pump protruding into the additional connection area of the device.

10. A component unit, comprising:
the supply container for washer fluid; and
the assembly according to claim 1, which serves for supplying the air to an opening of the supply container surrounding the connection area of the device in a sealing manner.

11. A wiper system for cleaning a vehicle window, comprising:
a supply container for a washer fluid;
a pump for suctioning the washer fluid from the supply container; and
at least one duct for supplying a cleaning medium from a pressure side of the pump to a spraying nozzle which is realized for spraying the cleaning medium onto the vehicle window in a wiping area of at least one wiper blade, and
a suction side of the pump being at least indirectly connected to a device to supply air, in addition to the washer fluid, so that the air is suctioned from the pump via the suction side of the pump to produce a foam-like cleaning medium from the washer fluid and the air at the pressure side,
wherein the device for supplying the air comprises:
a suction channel for suctioning the air, the suction channel being able to be fluidly connected to the suction side of the pump,
wherein the suction channel comprises a first section and a second section;
wherein the device is realized as a component separate from the pump;
a connection area for connecting the device with the supply container for the washer fluid;
an additional connection area for a suction nozzle of the pump,
wherein the second section radially surrounds the suction nozzle to form a supply gap fluidly connected to the suction side of the pump; and
a check valve disposed in the suction channel, the check valve being realized for opening and closing as a function of a negative pressure on the suction nozzle of the pump,
whereby when the check valve is opened, the air enters an area of the suction nozzle of the pump, and when the check valve is closed, no air is sucked.

12. The wiper system according to claim 11, wherein the pump is realized for foaming the washer fluid together with the air via at least one vane element.

13. The wiper system according to claim 11, wherein the pump is realized as a vane pump.

14. The wiper system according to claim 11, wherein the spraying nozzle is integrated in the at least one wiper blade.

15. The wiper system according to claim 11, wherein the spraying nozzle is separate from the at least one wiper blade.

* * * * *